(12) United States Patent
Takekawa et al.

(10) Patent No.: US 7,451,237 B2
(45) Date of Patent: Nov. 11, 2008

(54) DATA COMPRESSION PROGRAM, DATA COMPRESSION METHOD, AND DATA COMPRESSION DEVICE

(75) Inventors: Ikuo Takekawa, Kawasaki (JP); Teruhiko Onishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 10/434,346

(22) Filed: May 9, 2003

(65) Prior Publication Data

US 2003/0224734 A1 Dec. 4, 2003

(30) Foreign Application Priority Data

May 20, 2002 (JP) ............................. 2002-144607

(51) Int. Cl.
*G06F 15/16* (2006.01)
(52) U.S. Cl. .................. 709/247; 709/206; 382/239
(58) Field of Classification Search ............. 709/238, 709/247, 206; 370/474, 521; 386/52; 715/500; 714/702; 375/240; 711/112, 113; 358/1.16, 358/426.06; 382/173, 239; 707/204
See application file for complete search history.

(56) References Cited

U.S. PATENT DOCUMENTS

| | | | | | |
|---|---|---|---|---|---|
| 3,786,439 | A | * | 1/1974 | McDonald et al. | 714/702 |
| 4,124,870 | A | * | 11/1978 | Schatz et al. | 358/3.29 |
| 4,712,243 | A | * | 12/1987 | Ninomiya et al. | 704/250 |
| 5,177,480 | A | * | 1/1993 | Clark | 341/51 |
| 5,485,213 | A | * | 1/1996 | Murashita et al. | 375/240.12 |
| 5,518,408 | A | * | 5/1996 | Kawashima et al. | 434/307 A |
| 5,594,660 | A | * | 1/1997 | Sung et al. | 715/500.1 |
| 5,636,294 | A | * | 6/1997 | Grosse et al. | 382/239 |
| 5,652,857 | A | * | 7/1997 | Shimoi et al. | 711/113 |
| 5,675,789 | A | * | 10/1997 | Ishii et al. | 707/204 |
| 5,745,245 | A | * | 4/1998 | Shibata | 358/426.06 |
| 5,805,932 | A | | 9/1998 | Kawashima et al. | |
| 5,870,563 | A | * | 2/1999 | Roper et al. | 709/239 |

(Continued)

FOREIGN PATENT DOCUMENTS

WO    WO 95/29437    11/1995

OTHER PUBLICATIONS

Multiplatform multisensor fusion with adaptive-rate data communication☐☐Lang Rong; Wei-Chang Wang; Logan, M.; Donohue, T.;☐☐Aerospace and Electronic Systems, IEEE Transactions on☐☐vol. 33, Issue 1, Jan. 1997 pp. 274-281.*

(Continued)

*Primary Examiner*—Thong H Vu
(74) *Attorney, Agent, or Firm*—Staas & Halsey LLP

(57) ABSTRACT

A data compression program making a computer perform processing which enables compression of only highly compressible data. First, a transmitter-side device performs compression processing of a portion of data to be compressed. Next, the transmitter-side device compares volumes of the portion of the data before and after the compression processing, and determines whether or not the compression processing is effective. When the data to be compressed is uncompressed data, the volume of the portion of the data is reduced by the compression processing. On the other hand, when the data to be compressed is compressed data, the volume of the portion of the data is not reduced by the compression processing. Therefore, only when it is determined that the compression processing is effective, the transmitter-side device compresses the other portions of the data to be compressed.

8 Claims, 13 Drawing Sheets

U.S. PATENT DOCUMENTS

| | | | | |
|---|---|---|---|---|
| 5,917,988 | A * | 6/1999 | Eto | 386/52 |
| 5,991,515 | A * | 11/1999 | Fall et al. | 358/1.15 |
| 6,032,192 | A * | 2/2000 | Wegner et al. | 709/238 |
| 6,038,033 | A * | 3/2000 | Bender et al. | 358/1.16 |
| 6,307,971 | B1 * | 10/2001 | Persiantsev et al. | 382/236 |
| 6,385,199 | B2 * | 5/2002 | Yoshimura et al. | 370/393 |
| 6,393,149 | B2 * | 5/2002 | Friederich et al. | 382/173 |
| 6,411,228 | B1 * | 6/2002 | Malik | 341/67 |
| 6,421,134 | B1 * | 7/2002 | Kuroshima et al. | 358/1.15 |
| 6,611,919 | B1 * | 8/2003 | Matsuya et al. | 713/320 |
| 6,618,397 | B1 * | 9/2003 | Huang | 370/474 |
| 6,658,156 | B1 * | 12/2003 | Aritomi | 382/239 |
| 6,665,732 | B1 * | 12/2003 | Garofalakis et al. | 709/247 |
| 6,711,709 | B1 * | 3/2004 | York | 714/748 |
| 6,724,817 | B1 * | 4/2004 | Simpson et al. | 375/240.07 |
| 6,741,368 | B1 * | 5/2004 | Hoel | 358/1.9 |
| 6,816,942 | B2 * | 11/2004 | Okada et al. | 711/112 |
| 6,856,651 | B2 * | 2/2005 | Singh | 375/240 |
| 7,089,286 | B1 * | 8/2006 | Malik | 709/206 |
| 7,124,195 | B2 * | 10/2006 | Roach et al. | 709/232 |
| 2001/0008546 | A1 * | 7/2001 | Fukui et al. | 375/240.27 |
| 2003/0030575 | A1 * | 2/2003 | Frachtenberg et al. | 341/51 |
| 2003/0218606 | A1 * | 11/2003 | Zhirkov et al. | 345/419 |
| 2004/0042506 | A1 * | 3/2004 | Fallon et al. | 370/521 |
| 2006/0031558 | A1 * | 2/2006 | Ortega et al. | 709/232 |

OTHER PUBLICATIONS

Robustification of Detection and Tracking of Faces—Schwerdt, Crowley, Durand (1998) □□www-prima.inrialpes.fr/schwerdt/Publis/cvmr98_paper.ps.gz.*

Efficient Implementation of Progressive Meshes—Hoppe (1998) □□research.microsoft.com/~hoppe/efficientpm.pdf.*

Dynamic Approach to Visual Data Compression—Reusens, Ebrahimi, Le Buhan.. (1997) □□ltswww.epfl.ch/publications/papers/er_csvt97.ps.gz.*

Japanese Office Action dated Mar. 22, 2006 in corresponding Japanese Patent Application No. 2002-144607.

Patent Abstracts of Japan, Publication No. 07-264417, Published Oct. 13, 1995.

Patent Abstracts of Japan, Publication No. 2001-111432, Published Apr. 20, 2001.

Japanese Office Action dated Jun. 6, 2006 in corresponding Japanese Patent Application No. 2002-144607.

Patent Abstracts of Japan, Publication No. 04-242424, Published Aug. 31, 1992.

Patent Abstracts of Japan, Publication No. 04-277981, Published Oct. 2, 1992.

Patent Abstracts of Japan, Publication No. 10-285045, Published Oct. 23, 1998.

* cited by examiner

DATA COMPRESSION PROGRAM, DATA COMPRESSION METHOD, AND DATA COMPRESSION DEVICE

BACKGROUND OF THE INVENTION

1) Field of the Invention

The present invention relates to a data compression program, a data compression method, and a data compression device for compressing data. In particular, the present invention relates to a data compression program, a data compression method, and a data compression device which are suitable for compression of data to be transmitted.

2) Description of the Related Art

In recent years, data communications utilizing mobile telephone systems such as portable telephone or PHS (personal handyphone system) systems are extensively used. In particular, recently, data communication services using packet communications have become available, and many users are using such data communication services. According to the billing systems in the conventional packet communication systems, charges are calculated based on the numbers of packets which are transmitted and received. Therefore, it is desired that transmitted data are compressed as much as possible.

FIG. 13 is a conceptual diagram illustrating the conventional data compression processing. FIG. 13 illustrates data compression processing in an exemplary case where data output from a web server 910 and a mail server 920 are compressed by a compression processing unit 930, and transmitted through a network 940. For example, the web server 910 outputs document data 91 having an HTML (Hyper Text Markup Language) form, image data 92 compressed in a GIF (Graphics Interchange Format) form or the like, and other data, and the mail server 920 outputs mail data 93 having a text form. The document data 91, the image data 92, and the mail data 93 are compressed by the compression processing unit 930. Thus, document data 91a, image data 92a, and mail data 93a in compressed forms are generated in accordance with the compression method in the compression processing unit 930, and transmitted through the network 940.

According to the above construction, the volume of transmitted data can be reduced. Therefore, it is possible to reduce charges billed for packet communication as well as data transfer times.

In the above construction, in advance, each system (i.e., a device in which the compression processing unit 930 is installed) is configured to compress or not to compress data in the compression processing unit 930. That is, in advance, the compression processing function is set to "ON" or "OFF." Therefore, when the compression processing unit 930 is configured to compress data to be transmitted, compression processing is performed on all data transmitted through the compression processing unit 930.

However, the volumes of some types of data to be transmitted are not substantially reduced. For example, the volumes of data which have already been compressed do not decrease even when the data are recompressed. In such a case, the useless attempt to compress the data causes performance loss.

SUMMARY OF THE INVENTION

The present invention is made in view of the above problems, and the object of the present invention is to provide a data compression program, a data compression method, and a data compression device for compressing data, which enable compression of only highly compressible data.

In order to accomplish the above object, a data compression program which makes a computer perform the following sequence of processing is provided. The data compression program is characterized in that the sequence of processing comprises the steps of: (a) performing compression processing of a portion of a data item which is to be compressed; (b) comparing volumes of the portion of the data item before and after the compression processing in step (a), and determining whether or not the compression processing is effective; and (c) performing compression processing of a remaining portion of the data item only when it is determined in step (b) that the compression processing is effective.

In addition, in order to accomplish the above object, a data compression device for compressing data is provided. The data compression device is characterized by comprising: a compression means which performs processing for successively compressing a plurality of unit data elements constituting a data item which is to be compressed, while a compressibility indication flag provided for indicating whether or not compression is necessary indicates that compression is necessary; a determination means which compares volumes of at least one of the plurality of unit data elements before and after the processing is performed on the at least one of the plurality of unit data elements by the compression means, and determines whether or not compression is effective; and a flag setting means which changes the compressibility indication flag so as to indicate that compression is unnecessary, when the determination means determines that compression is not effective.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

An embodiment of the present invention is explained below with reference to drawings.

First, an outline of the present invention which is realized in the embodiment is explained, and thereafter details of the embodiment are explained.

Figure 1:
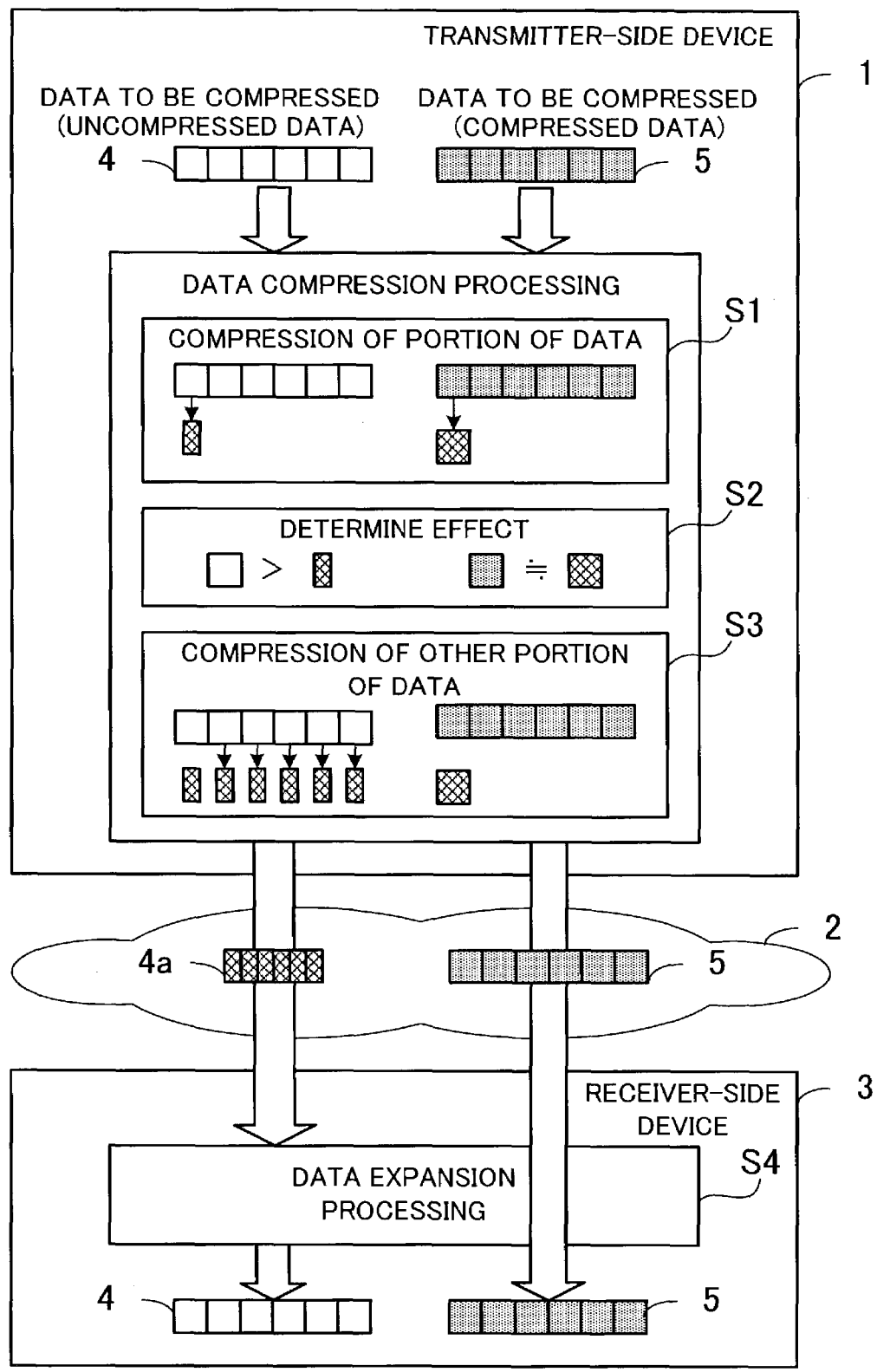
FIG. 1 is a conceptual diagram illustrating the present invention which is realized in an embodiment of the present invention.

FIG. 1 is a conceptual diagram illustrating the present invention which is realized in the embodiment of the present invention. FIG. 1 illustrates data compression processing performed in the case where data items 4 and 5 to be compressed are transmitted from a transmitter-side device 1 to a receiver-side device 3 through a network 2. In the example of FIG. 1, the data item 4 is an uncompressed data item such as a text data item, and the data item 5 is a compressed data item such as a compressed image data item. In this specification, data which is compressed is referred to as compressed data, and data which is not compressed is referred to as uncompressed data.

In step S1, the transmitter-side device 1 compresses a portion of each of the data items 4 and 5. For example, the transmitter-side device 1 divides each of the data items 4 and 5 into a plurality of unit data elements, and makes an attempt to successively compress the plurality of unit data elements from one of the plurality of unit data elements located at the top in an arrangement of each data item.

Next, in step S2, the transmitter-side device 1 compares the volumes of the portion of each data item before and after the compression processing, and determines whether or not the compression processing is effective. For example, it is possible to determine that the compression processing is effective when the volume of the portion of each data item is reduced by the compression processing even by a small amount. Since the data item 4 in the example of FIG. 1 is uncompressed, the volume of the data item 4 is reduced by the compression processing. On the other hand, the data item 5 in the example of FIG. 1 is already compressed. Therefore, even when the compression processing is performed on the data item 5, the volume of the data item 5 is almost unchanged, i.e., is not reduced.

In step S3, the transmitter-side device 1 compresses the other portions of each data item only when the compression processing of the above portion of the data item is determined to be effective. That is, the transmitter-side device 1 compresses the remaining portions of the uncompressed data item 4, and does not compress the remaining portions of the compressed data item 5.

Thereafter, the transmitter-side device 1 transmits the compressed data item 4a to the receiver-side device 3 through the network 2. In step S4, the receiver-side device 3 expands the compressed data item 4a so that the original data item 4 is reproduced. In addition, the transmitter-side device 1 transmits the data item 5 to the receiver-side device 3 through the network 2.

As described above, efficient data communication is enabled regardless of the form of data which represents content and is to be transmitted (e.g., regardless of whether the data is compressed or uncompressed). In particular, if useless compression processing is performed on large-volume data before transmission of the large-volume data, the data processing efficiency in the entire system is greatly reduced. Therefore, the present invention is particularly effective in the systems for online delivery of image data or sound data.

In addition, the present invention is particularly effective when applied to terminals which cannot allocate sufficient processing capabilities of CPUs (central processing units) to data compression processing. For example, in recent years, mobile networks are becoming widely available. In the mobile networks, browsing of content on the Internet and other operations are enabled by using terminals such as mobile telephones (portable telephones, PHSs, and the like) and car navigation systems. Such terminals have functions intrinsic to themselves as well as the function of data communication. For example, a function intrinsic to the mobile telephones is the wireless-phone-call function, and a function intrinsic to the car navigation systems is the route navigation function. When data communications are performed by using terminals designed for mobile communications, it is necessary to execute processing for data compression, data expansion, and the like associated with the data communications without impairment of the functions intrinsic to the terminals. Therefore, it is desired to minimize the load imposed on CPUs due to the data communications.

Hereinbelow, an embodiment of the present invention, in which the present invention is applied to communications through a mobile network, is explained in detail.

Figure 2:
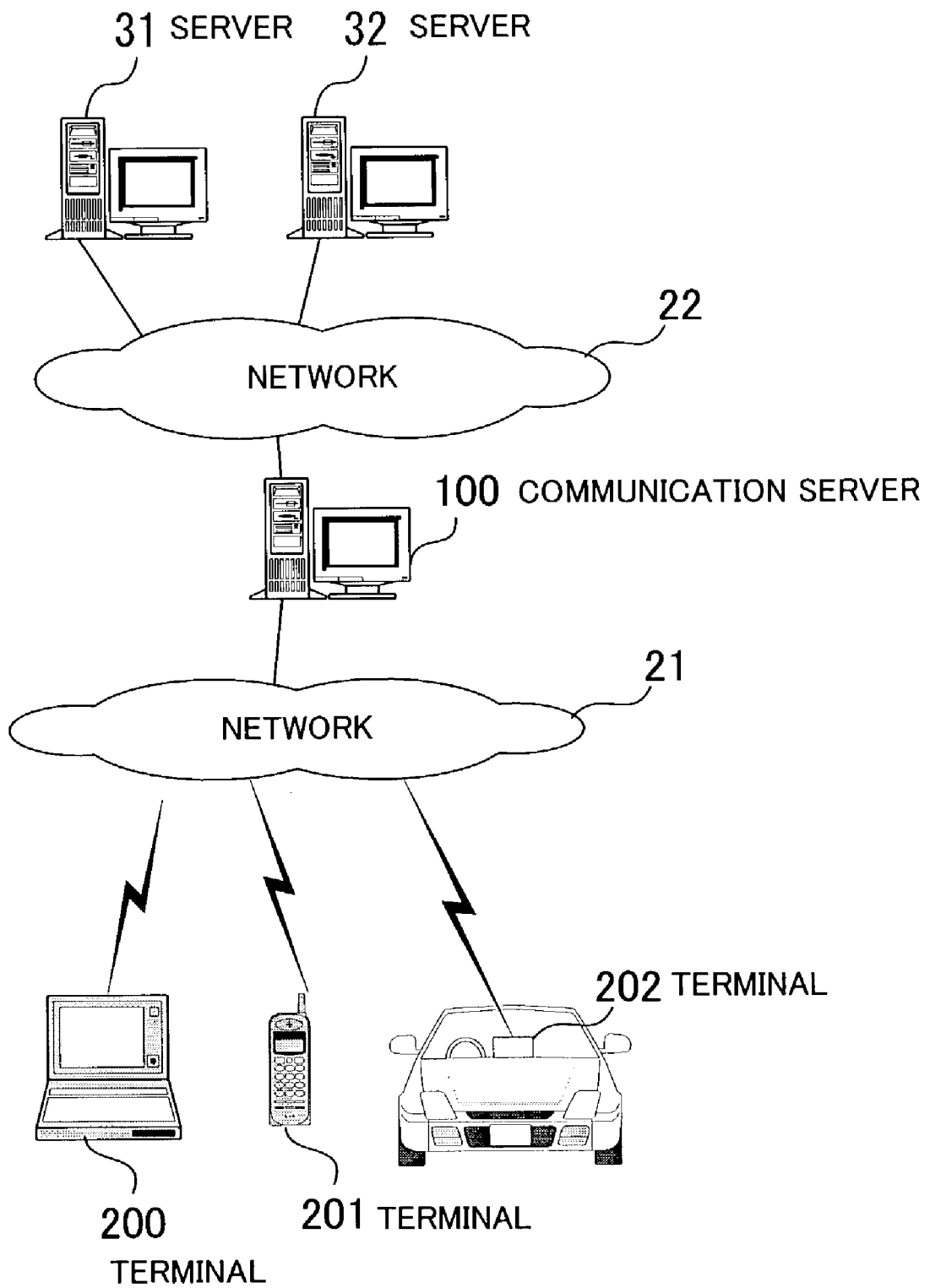
FIG. 2 is a diagram illustrating an exemplary system construction in the embodiment.

FIG. 2 is a diagram illustrating an exemplary system construction in the embodiment. As illustrated in FIG. 2, a communication server 100 is connected to networks 21 and 22. The communication server 100 has a function of a gateway between the networks 21 and 22, as well as a function of enabling TCP/IP (Transmission Control Protocol/Internet Protocol) communications through the networks 21 and 22.

The network 21 is, for example, a mobile network. A plurality of terminals 200 to 202 (e.g., a portable personal computer, a portable telephone, and a car navigation system) can be connected to the network 21.

The network 22 is, for example, the Internet or an intranet. Various servers 31 and 32 (e.g., content servers or application servers) can be connected to the network 22.

Data exchanged between the communication server 100 and the terminals 200 to 202 are divided into unit data elements, and transmitted in unit data elements. Each of the unit data elements has a volume corresponding to the sizes of communication buffers in the terminals 200 to 202.

Figure 3:
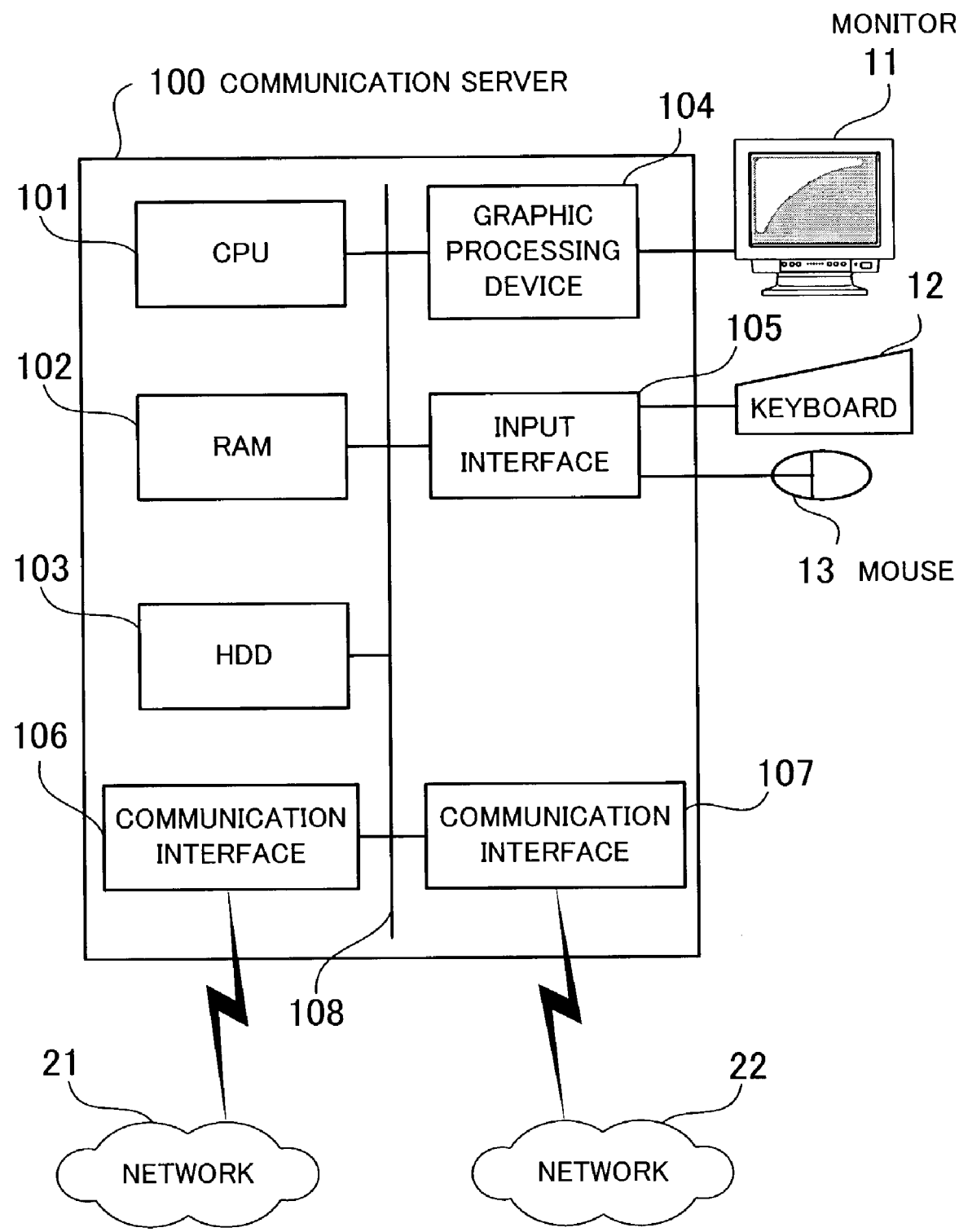
FIG. 3 is a diagram illustrating a hardware construction of a communication server used in the embodiment.

FIG. 3 is a diagram illustrating a hardware construction of a communication server used in the embodiment. The entire system of the communication server 100 is controlled by a CPU (central processing unit) 101, to which a RAM (random access memory) 102, an HDD (hard disk drive) 103, a graphic processing device 104, an input interface 105, and communication interfaces 106 and 107 are connected through a bus 108.

The RAM 102 temporarily stores at least a portion of an OS (operating system) program and application programs which are executed by the CPU 101, as well as various types of data which are necessary for the CPU 101 to perform processing. The HDD 103 stores the OS program and the application programs.

A monitor 11 is connected to the graphic processing device 104, which makes the monitor 11 display an image on an screen in accordance with an instruction from the CPU 101. A keyboard 12 and a mouse 13 are connected to the input interface 105, which transmits signals sent from the keyboard 12 and the mouse 13, to the CPU 101 through the bus 108.

The communication interface 106 is connected to the network 21. The communication interface 106 is provided for exchanging data with the terminals 200 to 202 through the network 21.

The communication interface 107 is connected to the network 22. The communication interface 107 is provided for exchanging data with the servers 31 and 32 through the network 22.

By using the above hardware construction, it is possible to realize processing functions in the present embodiment. In addition, each of the servers 31 and 32 and the terminals 200 to 202 can also be realized by using a hardware construction similar to that illustrated in FIG. 3. However, the communication interface 106 for connection with the network 21 is unnecessary in each of the servers 31 and 32. In addition, the communication interface 107 for connection with the network 22 is unnecessary in each of the terminals 200 to 202.

Further, each of the terminals 200 to 202 includes elements which realize intrinsic functions of the terminal. For example, when one of the terminals 200 to 202 is a mobile telephone, the terminal has a wireless-phone-call function. When one of the terminals 200 to 202 is a car navigation system, the terminal has a function of measuring the current position based on GPS (Global Positioning System), a function for navigation to a destination, and the like.

Furthermore, although each of the terminals 200 to 202 has an output device corresponding to the monitor 11 in FIG. 3 and input devices corresponding to the keyboard 12 and the mouse 13 in FIG. 3, the output device and the input devices may be integrated into the main body of the terminal. Alternatively, the input devices may be connected to the main body of the terminal through a wireless link.

Next, details of data communication processing between the communication server 100 and the terminals 200 to 202 are explained below. Although the following explanations are provided for data communication processing between the communication server 100 and the terminal 200 as a representative example, each of the terminals 201 and 202 has the same functions as the terminal 200.

Figure 4:
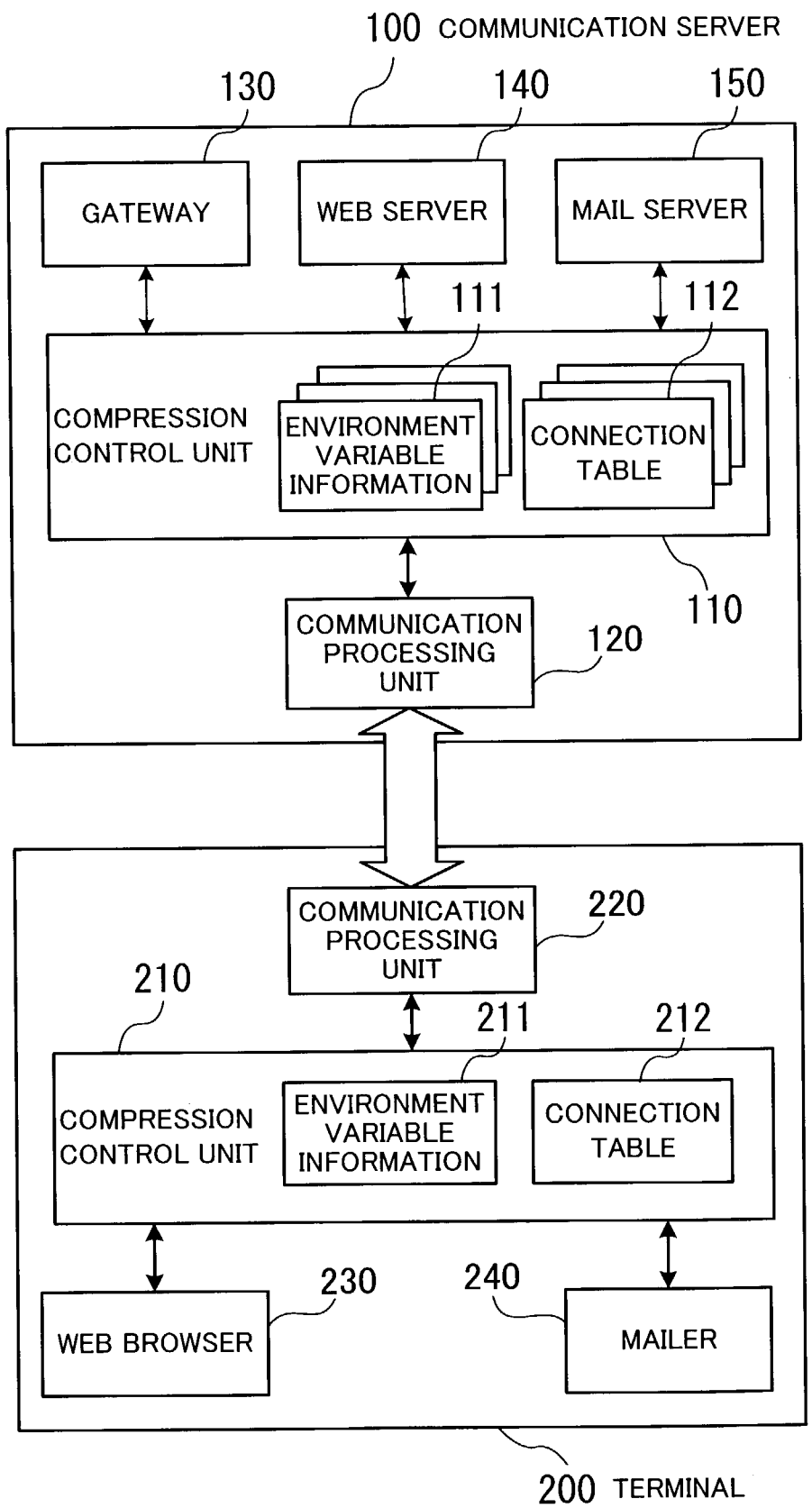
FIG. 4 is a function block diagram illustrating functions for data communication performed between the communication server and a terminal.

FIG. 4 is a function block diagram illustrating functions for data communication performed between the communication server and a terminal. In the example of FIG. 4, the communication server 100 comprises a compression control unit 110, a communication processing unit 120, a gateway 130, a web server 140, and a mail server 150.

The compression control unit 110 compresses and expands data. Specifically, when the compression control unit 110 receives data which is to be transmitted to the terminal 200, from the gateway 130, the web server 140, the mail server 150, or the like, the compression control unit 110 determines whether or not the efficiency of compression of the data is satisfactory. When the compression control unit 110 determines that the efficiency of compression of the data is satisfactory, the compression control unit 110 compresses the data, and passes the compressed data to the communication processing unit 120. At this time, the compression control unit 110 attaches to the data a flag (compressibility indication flag) indicating that the data is compressed. In addition, when the compression control unit 110 determines that the efficiency of compression of the data is unsatisfactory, the compression control unit 110 does not compress the data, and passes the original data to the communication processing unit 120.

The compression control unit 110 determines whether or not the efficiency of compression of the data is satisfactory, by making an attempt to perform compression processing of a portion of the data to be transmitted. That is, when a compression ratio (i.e., a percentage of a volume of processed data to a volume of original data) in compression processing of a unit data element is below a predetermined value (corresponding to a threshold value of the compression efficiency), the efficiency of compression of the data is determined to be satisfactory. Otherwise, the efficiency of compression of the data is determined to be unsatisfactory. For example, the threshold value of the compression efficiency may be set to 100%. In this case, when the data volume is reduced even by a small amount, the compression control unit 110 determines that the compression efficiency is satisfactory. For example, when an attempt to perform compression processing of data which has already been compressed is made, the original data is not compressed, and additional header information is attached. In such a case, the compression efficiency becomes equal to or greater than 100%.

In order to perform data compression processing, the compression control unit 110 includes environment variable information 111 for each compression control process and a connection table 112 for each connection between the communication server 100 and the terminal 200. Each compression control process is generated associated with the terminal in response to a request for establishment of communication, which is received from the terminal 200 or another terminal 201 or 202. Each connection is established between the communication server 100 and the terminal 200 or another terminal 201 or 202 for each processing request (e.g., a data acquisition request) received from the terminal. The contents of the environment variable information 111 and the connection table 112 are explained later in detail.

When the compression control unit 110 receives data from the terminal 200 or another terminal 201 or 202 through the communication processing unit 120, the compression control unit 110 determines whether or not the data is compressed. When the data is compressed, the compression control unit 110 expands the data, and passes the expanded data to the gateway 130, the web server 140, or the mail server 150. It is possible to determine whether or not data is compressed, based on the value of the flag (compressibility indication flag) attached to the data.

The communication processing unit 120 performs data communication with the terminal 200 or another terminal 201 or 202. In the present embodiment, it is assumed that TCP/IP communication is performed.

The gateway 130 is provided for connecting the terminal 200 to another server 31 or 32 connected to the network 22. The web server 140 provides content and the like to the terminal 200. The mail server 150 receives and holds e-mails addressed to a user who uses the terminal 200, and transmits e-mails sent from the terminal 200 and addressed to other computers.

Although the web server 140 and the mail server 150 are arranged in the communication server 100 in the example of FIG. 4, the web server 140 and the mail server 150 may be arranged in another server computer connected to the network 22. In this case, the terminal 200 can access the web server 140 or the mail server 150 through the gateway 130.

The terminal 200 comprises a compression control unit 210, a communication processing unit 220, a web browser 230, and a mailer 240.

The compression control unit 210 compresses and expands data. Specifically, when the compression control unit 210 receives data which is to be transmitted to the communication server 100 or another server 31 or 32, from the web browser 230 or the mailer 240, the compression control unit 210 determines whether or not the efficiency of compression of the data is satisfactory. When the compression control unit 210 determines that the efficiency of compression of the data is satisfactory, the compression control unit 210 compresses the data, and passes the compressed data to the communication processing unit 220. When the compression control unit 210 determines that the efficiency of compression of the data is unsatisfactory, the compression control unit 210 does not compress the data, and passes the original data to the communication processing unit 220. The compression control unit 210 determines whether or not the efficiency of compression of the data is satisfactory, in a similar manner to the compression control unit 110. In addition, in order to perform data compression processing, the compression control unit 210 includes environment variable information 211 and a connection table 212, which is provided for each connection between the communication server 100 and the terminal 200.

Further, when the compression control unit 210 receives data from the communication server 100 through the communication processing unit 220, the compression control unit 210 determines whether or not the data is compressed. When the data is compressed, the compression control unit 210 expands the data, and passes the expanded data to the web browser 230 or the mailer 240. It is possible to determine whether or not data is compressed, based on the value of the flag (compressibility indication flag) attached to the data.

The communication processing unit 220 performs data communication with the communication server 100. In the present embodiment, it is assumed that TCP/IP communication is performed.

The web browser 230 has a function of browsing content provided by the web server 140 or the like. Specifically, the web browser 230 transmits to various servers a request for acquisition of data of content or the like in response to user's manipulation input or the like, and displays on a screen data which is transmitted in response to the request for acquisition.

The mailer 240 transmits and receives e-mails. Specifically, the mailer 240 generates e-mail data in response to user's manipulation input, and transmits the e-mail data to the mail server 150. In addition, the mailer 240 receives from the mail server 150 e-mails addressed to the user who uses the terminal 200, and displays the contents of the e-mails on the screen.

Figure 5:
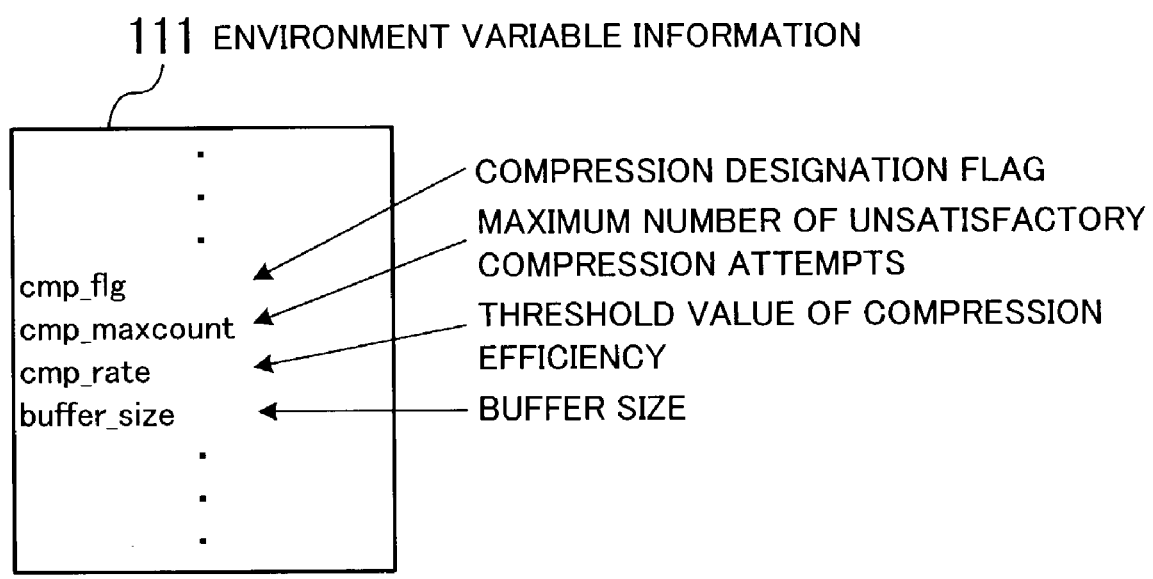
FIG. 5 is a diagram illustrating an example of a data structure of environment variable information.

FIG. 5 is a diagram illustrating an example of a data structure of the environment variable information 111. In the environment variable information 111, a compression designation flag (cmp_flg), a maximum number of unsatisfactory compression attempts (cmp_maxcount), a threshold value of the compression efficiency (cmp_rate), a buffer size (buffer_size), and the like are set. When a communication state is established between the communication server 100 and the terminal 200, the terminal 200 passes the compression designation flag (cmp_flg), the maximum number of unsatisfactory compression attempts (cmp_maxcount), the threshold value of the compression efficiency (cmp_rate), and the buffer size (buffer_size) to the communication server 100.

The compression designation flag (cmp_flg) is information which indicates whether or not data to be transmitted between the communication server 100 and the terminal 200 corresponding to the environment variable information 111 should be compressed. In the present embodiment, the compression designation flag is set to "1" when the data is to be compressed before transmission, and to "0" when the data is not to be compressed.

The maximum number of unsatisfactory compression attempts (cmp_maxcount) is information which indicates a criterion for determining necessity to compress the entire data to be transmitted. A maximum number of successive unit data elements which are obtained by division of each data item and are not compressed with satisfactory compression efficiency in attempts to compress a portion of the data item is set as the maximum number of unsatisfactory compression attempts (cmp_maxcount). When the number of successive unit data elements which constitute a data item to be transmitted and are not compressed with satisfactory compression efficiency reaches the maximum number of unsatisfactory compression attempts (cmp_maxcount), it is determined that compression of the data item is unnecessary, and compression processing of the remaining portion of the data item can be dispensed with.

The threshold value of the compression efficiency (cmp_rate) is information as a criterion for determining whether or not compression efficiency is satisfactory. When a ratio of a volume of a unit data element after compression processing to a volume of the unit data element before the compression processing is equal to or greater than the threshold value of the compression efficiency (cmp_rate), it is determined that the compression efficiency is unsatisfactory. When a ratio of a volume of a unit data element after compression processing to a volume of the unit data element before the compression processing is smaller than the threshold value of the compression efficiency (cmp_rate), it is determined that the compression efficiency is satisfactory.

The buffer size (buffer_size) indicates the size of a communication buffer which the terminal 200 corresponding to the environment variable information 111 has. The compression control unit 110 divides data to be transmitted into a plurality of unit data elements so that each unit data element has a volume corresponding to a value which is set as the buffer size (buffer_size).

Although FIG. 5 illustrates an example of the data structure of the environment variable information 111, the environment variable information 211 in the terminal 200 has a similar data structure.

Figure 6:
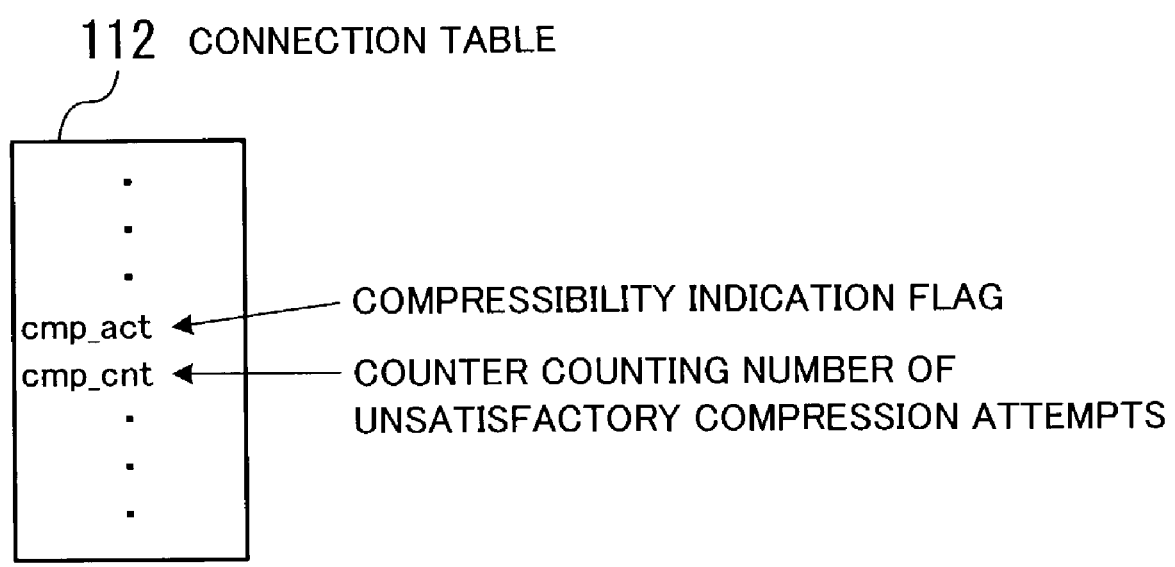
FIG. 6 is a diagram illustrating an example of a data structure of a connection table.

FIG. 6 is a diagram illustrating an example of a data structure of the connection table 112. The connection table 112 includes a compressibility indication flag (cmp_act) and a counter counting the number of unsatisfactory compression attempts (cmp_cnt).

The compressibility indication flag (cmp_act) is information indicating whether or not a unit data element to be transmitted should be compressed (i.e., should undergo compression processing).

When the compressibility indication flag (cmp_act) indicates ON (i.e., the compressibility indication flag (cmp_act) is set to "1"), the compression processing is performed on the unit data element. When the compressibility indication flag (cmp_act) indicates OFF (i.e., the compressibility indication flag (cmp_act) is set to "0"), the compression processing is not performed on the unit data element. The value of the compressibility indication flag (cmp_act) is set by the compression control unit 110 based on a result of determination whether or not compression is necessary. In addition, when the compressibility indication flag (cmp_act) based on a result of determination as to necessity of compression of data (each unit data element) to be transmitted is attached to the data (each unit data element), it is possible to indicate whether or not the data is compressed.

The counter counting the number of unsatisfactory compression attempts (cmp_cnt) is a counter which indicates the number of successive inefficient compression attempts. When the value of the counter counting the number of unsatisfactory compression attempts (cmp_cnt) is compared with the maximum number of unsatisfactory compression attempts (cmp_maxcount) in the environment variable information 111, it is possible to determine whether or not the corresponding data to be transmitted should be compressed.

The value of the counter counting the number of unsatisfactory compression attempts (cmp_cnt) is set by the compression control unit 110. The conditions for setting a value in the counter counting the number of unsatisfactory compression attempts (cmp_cnt) are as follows.

When the connection table 112 is produced, an initial value "0" is set in the counter counting the number of unsatisfactory compression attempts (cmp_cnt). In addition, when a connection is reused (i.e., when transmission of each data item is started in the case where a connection is maintained and a plurality of data items are transferred through the maintained connection) the initial value "0" is set in the counter counting the number of unsatisfactory compression attempts (cmp_cnt) on reception of each data item. Further, when efficient compression processing is performed, "0" is set in the counter counting the number of unsatisfactory compression attempts (cmp_cnt) (i.e., the counter counting the number of unsatisfactory compression attempts (cmp_cnt) is cleared). When inefficient compression processing is performed, the value of the counter counting the number of unsatisfactory compression attempts (cmp_cnt) is incremented by one.

Although FIG. 6 illustrates an example of the data structure of the connection table 112, the connection table 212 in the terminal 200 has a similar data structure.

Next, data communication processing in the present embodiment is explained. In the present embodiment, when it is specified that data is to be compressed, communication is performed in such a manner that compression processing is activated. Then, the compression efficiency is determined for each TCP/IP connection. When it is determined that the compression efficiency is unsatisfactory, thereafter compression processing is not performed in data transmission through the same connection in the same direction.

Figure 7:
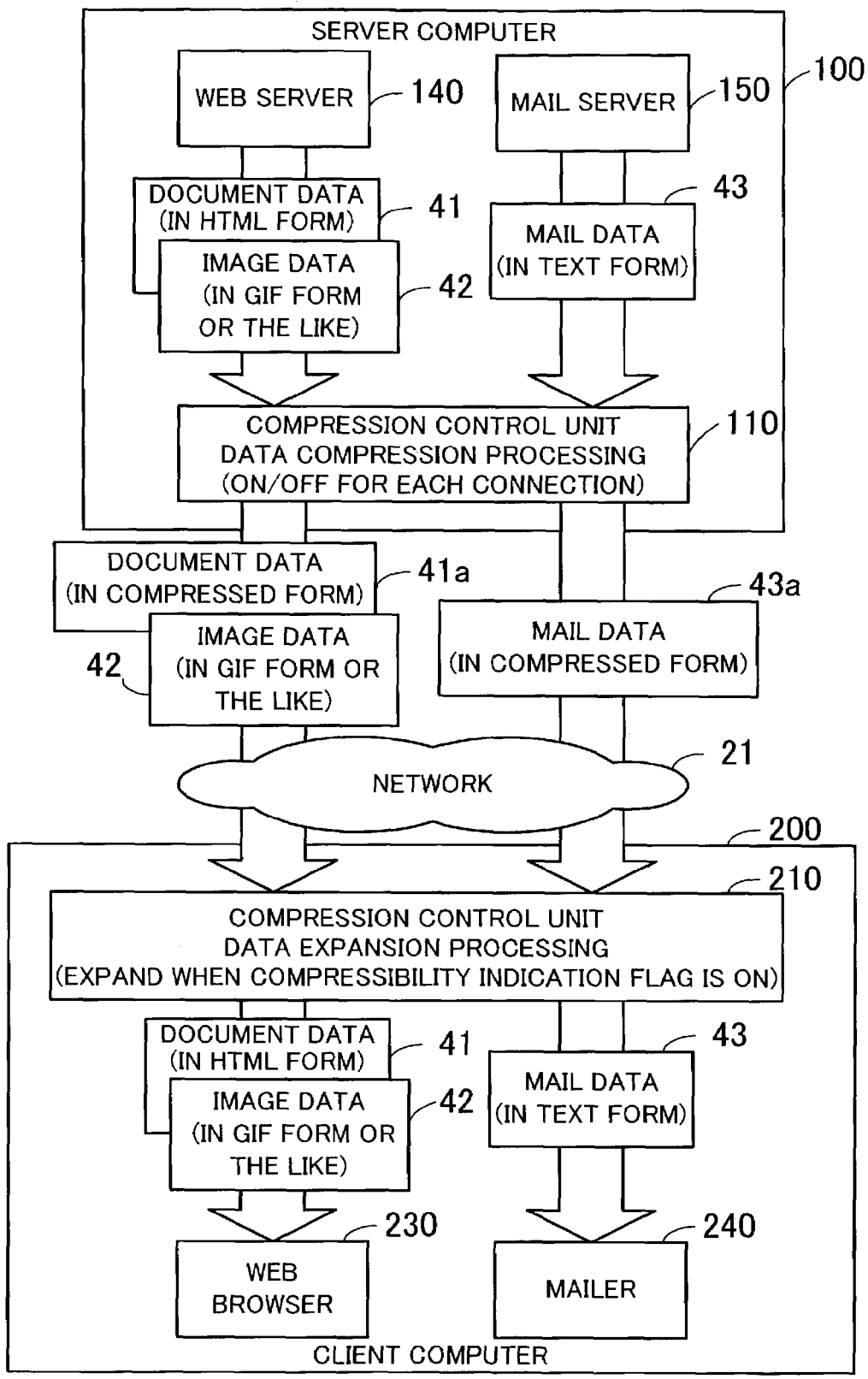
FIG. 7 is a conceptual diagram illustrating a state of data communication.

FIG. 7 is a conceptual diagram illustrating a state of data communication. In the example of FIG. 7, the web server 140 in the communication server 100 outputs data addressed to the terminal 200, where the data may be document data 41 in an HTML form or image data 42 in a compressed form such as a GIF form. In addition, the mail server 150 in the communication server 100 outputs mail data 43 in a text form as other data addressed to the terminal 200. The above data 41, 42, and 43 are respectively transmitted through separate connections.

The compression control unit 110 activates or deactivates compression processing on a connection-by-connection basis. Since the document data 41 and the mail data 43 are not originally compressed, the compression control unit 110 compresses the document data 41 and the mail data 43, and document data 41a and mail data 43a in compressed forms are transmitted through the network 21 to the terminal 200. At this time, information indicating that each data are compressed (the compressibility indication flag indicating "ON") is attached to each data.

Since the image data 42 is originally compressed, the volume of the image data 42 is not so much reduced by further compression processing. In addition, the volume of the image data 42 may be increased by addition of header information and the like. Therefore, the compression control unit 110 makes an attempt to compress a portion of the image data 42, and recognizes that the compression efficiency is unsatisfactory. Thus, the compression control unit 110 does not compress the remaining portion of the image data 42, and the original image data 42 is transmitted through the network 21 to the terminal 200.

When the terminal 200 detects that the compressibility indication flag of received data is ON, the compression control unit 210 expands the data. Therefore, the document data 41a and the mail data 43a in compressed forms are expanded, and the original document data 41 and the original mail data 43 are reproduced. On the other hand, expansion processing is not performed on the image data 42. Then, the data are respectively passed to elements (e.g., the web browser 230 or the mailer 240) which should process the data.

As described above, data which can be effectively compressed, such as data in HTML or text forms, are compressed before transmission. Therefore, the volumes of the transmitted data and the transmission times are reduced. On the other hand, as in the case of the image data in a compressed form, when the volume of a portion of data located at the top is not reduced by compression processing, compression processing is not performed on the remaining portion of the data. Therefore, useless compression processing is not performed, and the CPU time spent for compression can be reduced. The reduction in the CPU time reduces the load imposed on the CPU. Thus, the performance of the entire system can be improved.

In the example of FIG. 7, data is transferred from the communication server 100 to the terminal 200. Similarly, in the case of data transfer from the terminal 200 to the communication server 100, data is compressed before the transfer when the data is compressed with satisfactory compression efficiency.

Figure 8:
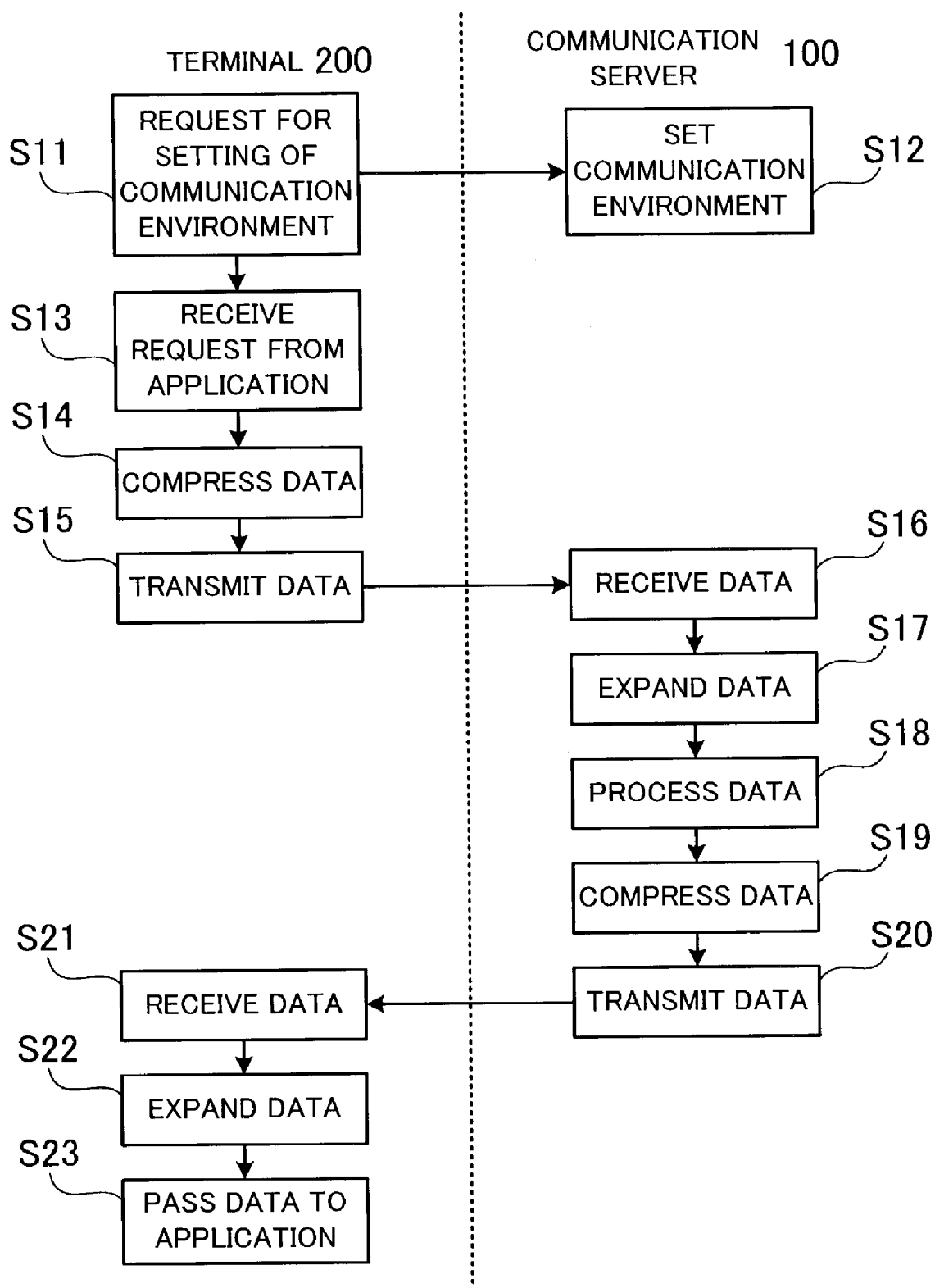
FIG. 8 is a sequence diagram illustrating a sequence of data communication.

FIG. 8 is a sequence diagram illustrating a sequence of data communication. In the example of FIG. 8, a processing request (e.g., a request for acquisition of data) is transmitted from the terminal 200 to the communication server 100, and a processing result (e.g., acquired data) is transmitted from the communication server 100 to the terminal 200. The processing illustrated in FIG. 8 is explained below step by step.

[Step S11] The terminal 200 transmits to the communication server 100 a request for setting of a communication environment. This request includes the environment variable information 211, which is preset in the terminal 200.

[Step S12] In response to the request for setting of a communication environment, the communication server 100 generates the environment variable information 111 corresponding to the terminal 200. Information (such as the compression designation flag, the maximum number of unsatisfactory compression attempts, the threshold value of the compression efficiency, and the buffer size) having identical values to the environment variable information 211 are set in the generated environment variable information 111. In the example of FIG. 8, it is assumed that the value of the compressibility indication flag is "1," i.e., compression is designated.

[Step S13] The compression control unit 210 in the terminal 200 receives a processing request to be transmitted to the communication server 100, from an application (i.e., a processing function based on application software) such as the web browser 230 or the mailer 240.

[Step S14] The compression control unit 210 in the terminal 200 divides a data item constituting the processing request passed from the application, into a plurality of unit data elements, and starts compression processing of the plurality of unit data elements. When the plurality of unit data elements are compressed with satisfactory compression efficiency, the compression control unit 210 passes the compressed unit data elements to the communication processing unit 220. At this time, a compressibility indication flag indicating that each unit data element is compressed is attached to the compressed unit data element. In addition, when the plurality of unit data elements are not compressed with satisfactory compression efficiency, the compression control unit 210 passes to the communication processing unit 220 the original unit data elements, on which the compression processing is not performed. When it is determined that the data item is not compressed with satisfactory compression efficiency, during the compression processing of the plurality of unit data elements, the compression processing is not performed on the remaining unit data elements on which compression processing have not been performed at the time of the determination.

[Step S15] The communication processing unit 220 in the terminal 200 transmits to the communication server 100 unit data elements received from the compression control unit 210.

[Step S16] The communication processing unit 120 in the communication server 100 receives the unit data elements transmitted from the terminal 200, and passes the received unit data elements to the compression control unit 110.

[Step S17] The compression control unit 110 in the communication server 100 determines whether or not a compressibility indication flag is attached to each of the received unit data elements. When a compressibility indication flag indicating that one of the received unit data elements is compressed is attached, the compression control unit 110 expands the one of the received unit data elements. It is unnecessary to perform expansion processing of a unit data element to which a compressibility indication flag indicating that the unit data elements is not compressed is attached.

[Step S18] The compression control unit 110 in the communication server 100 reproduces the original data (the processing request) by combining the uncompressed unit data elements, and passes the reproduced original data to an element (e.g., the gateway 130, the web server 140, or the mail server 150) which should perform processing corresponding to the processing request. Then, the element which receives the processing request performs the processing corresponding to the processing request, and passes data representing a processing result to the compression control unit 110.

[Step S19] The compression control unit 110 in the communication server 100 refers to the compression designation flag in the environment variable information 111, and determines whether or not compression processing of the data to be transmitted to the terminal 200 is necessary. When the compression processing is determined to be necessary, the compression control unit 110 divides the data representing the processing result into a plurality of unit data elements each of which has a volume corresponding to the buffer size set in the environment variable information 111, and starts compression processing of the plurality of unit data elements. When the plurality of unit data elements are compressed with satisfactory compression efficiency, the compression control unit 110 passes the compressed unit data elements to the communication processing unit 120. In addition, when the plurality of unit data elements are not compressed with satisfactory compression efficiency, the compression control unit 110 passes to the communication processing unit 120 the original unit data elements, on which the compression processing is not performed. When it is determined that the data item is not compressed with satisfactory compression efficiency, during the compression processing of the plurality of unit data elements, the compression processing is not performed on the remaining unit data elements on which compression processing have not been performed at the time of the determination.

[Step S20] The communication processing unit 120 in the communication server 100 transmits to the terminal 200 unit data elements received from the compression control unit 110.

[Step S21] The communication processing unit 220 in the terminal 200 receives the unit data elements transmitted from the communication server 100, and passes the received unit data elements to the compression control unit 210.

[Step S22] The compression control unit 210 in the terminal 200 determines whether or not a compressibility indication flag is attached to each of the received unit data elements. When a compressibility indication flag indicating that one of the received unit data elements is compressed is attached, the compression control unit 210 expands the one of the received unit data elements. It is unnecessary to perform expansion processing of a unit data element to which a compressibility indication flag indicating that the unit data element is not compressed is attached.

[Step S23] The compression control unit 210 in the terminal 200 reproduces the original data (the processing result) by combining the uncompressed unit data elements, and passes the data representing the processing result to the application which outputs the processing request in step S13.

Incidentally, in data transfer from the terminal 200 to the communication server 100 or from the communication server 100 to the terminal 200, it is possible to transmit a plurality of data items through a single connection. For example, in the case of the HTTP (Hyper Text Transfer Protocol) communication, it is possible to utilize the HTTP keep alive function. That is, when the terminal 200 sends to the communication server 100 a request in which an option of the HTTP keep alive function is designated, the communication server 100 which recognizes the option maintains the connection (i.e., the connection state) even after the communication server 100 transfers to the terminal 200 data in response to the request.

Generally, effectiveness of compression is common to all data items which are successively transferred. For example, consider a case in which content in a webpage is transferred from a web server to a terminal. When the webpage includes character-based information such as an e-conference record, compression is effective for data items which are successively transferred, since, in many cases, character information is included in an HTML document without compression. On the other hand, in the case of reception of musical content, for example, reception of streaming music delivery, compression of the continuously transferred data is useless. In addition, generally, musical content is compressed in advance.

Therefore, in the present embodiment, in the case where data are successively transferred in an identical direction (e.g., from a terminal to a communication server or from a communication server to a terminal) while a connection is maintained, once compression is determined to be ineffective, thereafter the state in which compression is unnecessary is maintained. However, when a connection is disconnected and a new connection is established, or when the direction of data transmission is reversed in a connection, it is determined that a different type of data is transferred, and the system is set to a state in which compression is necessary.

Hereinbelow, processing for transmission and reception in the case where a connection is maintained and a plurality of data items are transmitted through the connection is explained in detail. In order to realize the transmission and reception, similar sequences of processing are performed in the communication server 100 and the terminal 200. Therefore, a sequence of processing performed by the communication server 100 is explained as a representative example.

Figure 9:
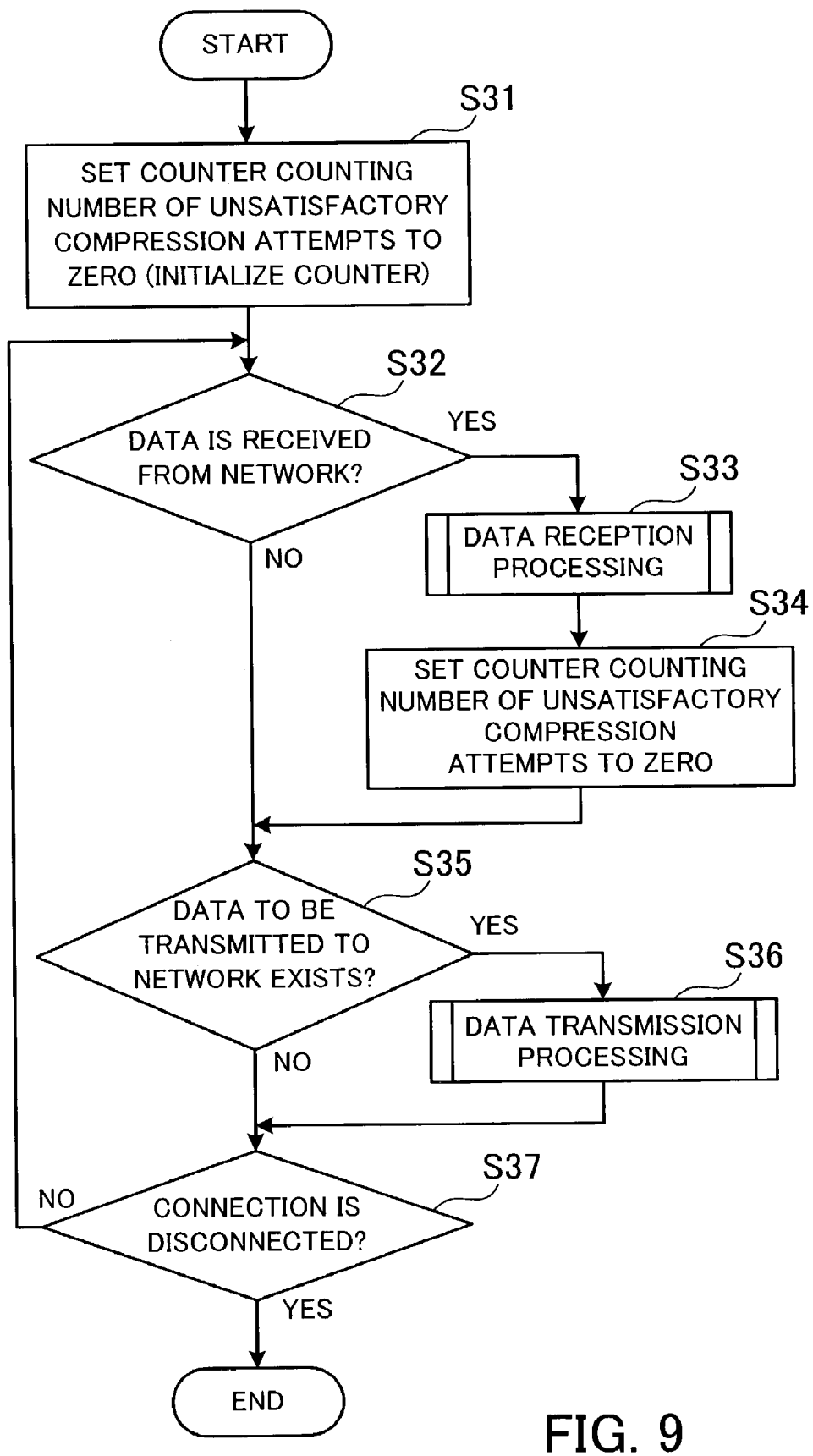
FIG. 9 is a flowchart indicating a sequence of processing for transmitting and receiving data.

FIG. 9 is a flowchart indicating a sequence of processing for transmitting and receiving data. The processing illustrated in FIG. 9 is explained below step by step. [Step S31] The compression control unit 110 initializes the counter counting the number of unsatisfactory compression attempts, i.e., sets zero in the counter counting the number of unsatisfactory compression attempts.

[Step S32] The compression control unit 110 determines whether or not data is received from the network 21, (i.e., from the communication processing unit 120). When yes is determined, the operation goes to step S33. When no is determined, the operation goes to step S35.

[Step S33] The compression control unit 110 performs processing for reception of the data. Details of the data reception processing are explained later.

[Step S34] The compression control unit 110 sets "0" in the counter counting the number of unsatisfactory compression attempts.

[Step S35] The compression control unit 110 determines whether or not data to be transmitted to the network 21 exists. That is, the compression control unit 110 determines whether or not the compression control unit 110 has received from the gateway 130, the web server 140, or the mail server 150 data to be transmitted to the terminal 200. When data to be transmitted exists, the operation goes to step S36. When no data to be transmitted exists, the operation goes to step S37.

[Step S36] The compression control unit 110 performs processing for transmitting the data. Details of the data transmission processing are explained later.

[Step S37] The compression control unit 110 determines whether or not the connection is disconnected. The communication processing unit 120 disconnects a connection in response to a disconnection request from the terminal 200. When the connection is disconnected, the processing of FIG. 9 is completed. When the connection is maintained, the operation goes to step S32.

Hereinbelow, details of the data reception processing and the data transmission processing are explained. Although, in FIG. 9, the data reception processing is indicated in the stage preceding the data transmission processing, the data transmission processing is first explained for ease of understanding.

Figure 10:
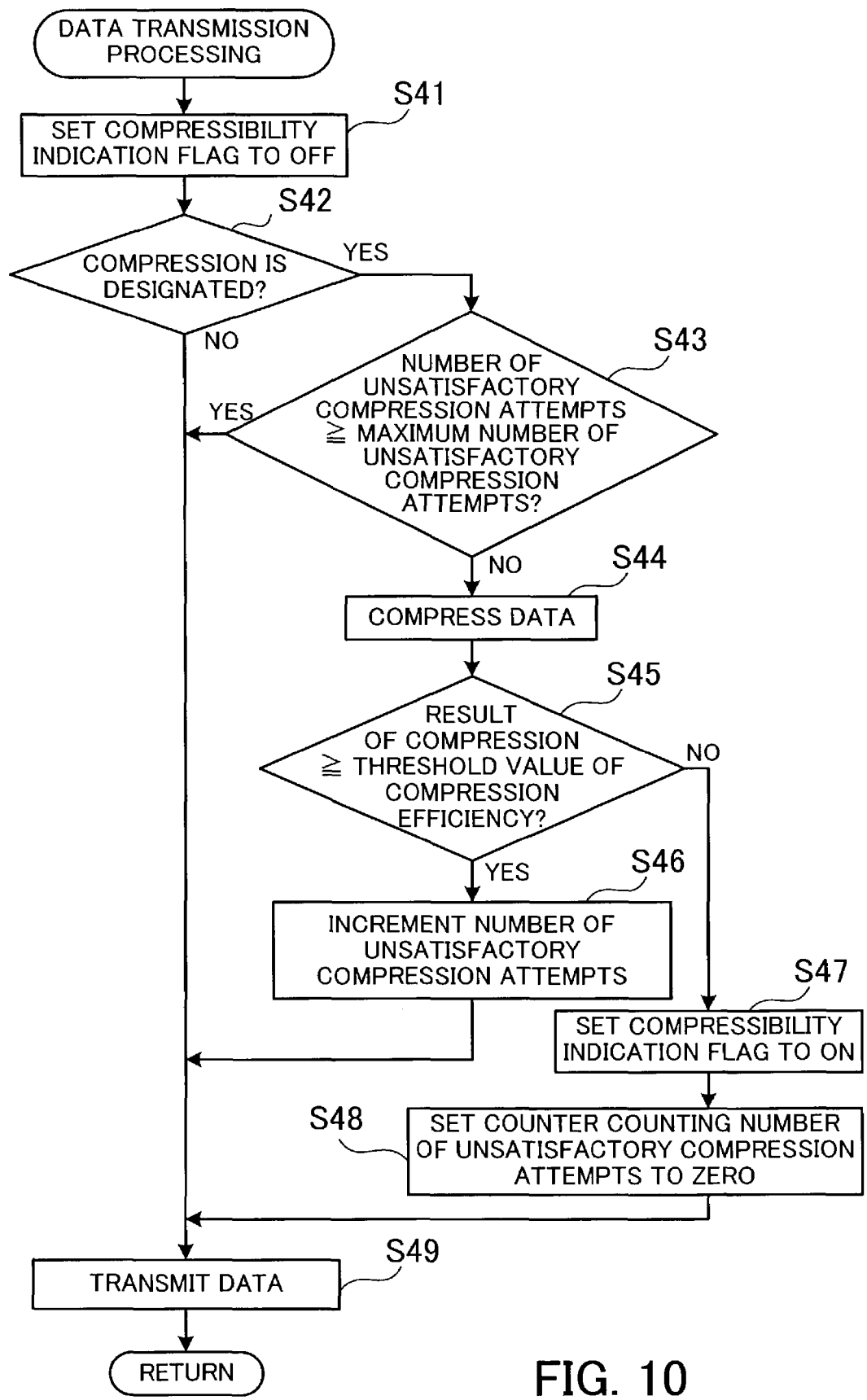
FIG. 10 is a flowchart indicating details of processing for transmitting data.

FIG. 10 is a flowchart indicating details of processing for transmitting data. The processing illustrated in FIG. 10 is explained below step by step.

[Step S41] The compression control unit 110 sets the compressibility indication flag in the connection table 112 to "OFF."

[Step S42] The compression control unit 110 refers to the compression designation flag in the environment variable information 111, and determines whether or not compression processing is specified to be executed. When execution of the compression processing is specified, the operation goes to step S43. When execution of the compression processing is not specified, the operation goes to step S49.

[Step S43] The compression control unit 110 determines whether or not the value of the counter counting the number of unsatisfactory compression attempts which is set in the connection table 112 is equal to or greater than the maximum number of unsatisfactory compression attempts which is set in the environment variable information 111. When yes is determined, the operation goes to step S49. When no is determined, the operation goes to step S44.

[Step S44] The compression control unit 110 compresses a unit data element.

[Step S45] The compression control unit 110 determines whether or not the compression efficiency in the compression is equal to or greater than the threshold value of the compression efficiency. The compression efficiency is a percentage of a volume of compressed data to a volume of original data. When the compression efficiency is equal to or greater than the threshold value of the compression efficiency, i.e., when the compression efficiency is unsatisfactory, the operation goes to step S46. When the compression efficiency is smaller than the threshold value of the compression efficiency, the operation goes to step S47.

[Step S46] The compression control unit 110 increments the value of the counter counting the number of unsatisfactory compression attempts by one. Thereafter, the operation goes to step S49.

[Step S47] The compression control unit 110 sets the compressibility indication flag in the connection table 112 to "ON."

[Step S48] The compression control unit 110 sets "0" in the counter counting the number of unsatisfactory compression attempts in the connection table 112. That is, since efficient compression is realized, succession of inefficient compression attempts stops. Therefore, the value of the counter counting the number of unsatisfactory compression attempts is initialized.

[Step S49] The compression control unit 110 attaches a compressibility indication flag to the data (the original data or the data compressed in step S44), and passes the data to the communication processing unit 120. The compressibility indication flag indicates "ON" when the data is compressed, and "OFF" when the data is uncompressed. Then, the communication processing unit 120 transmits the data to the terminal 200. Thereafter, the operation goes to step S37 in FIG. 9.

Figure 11:
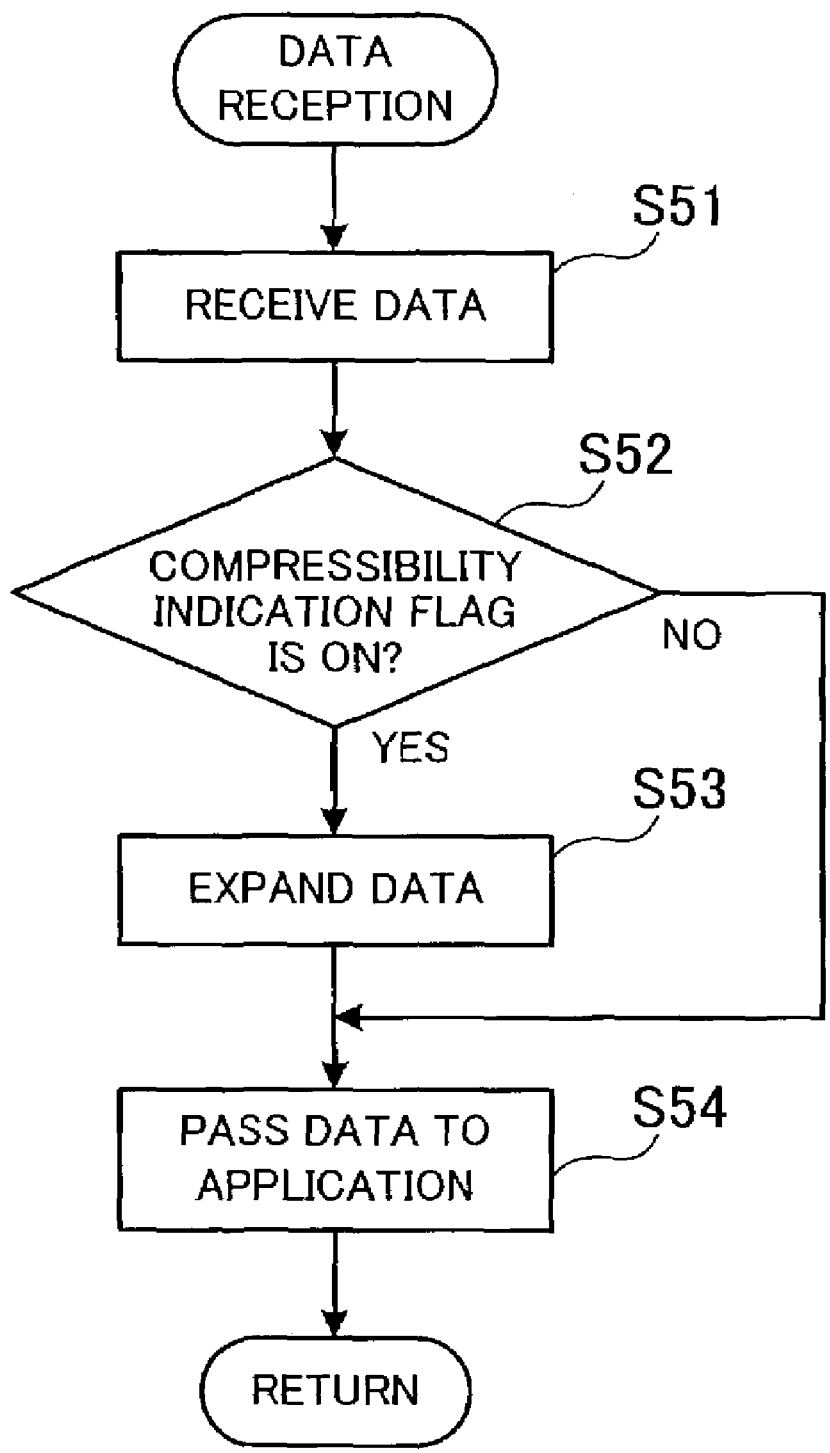
FIG. 11 is a flowchart indicating details of processing for receiving data.

FIG. 11 is a flowchart indicating details of processing for receiving data. The processing illustrated in FIG. 11 is explained below step by step.

[Step S51] The compression control unit 110 receives data from the communication processing unit 120.

[Step S52] The compression control unit 110 determines whether or not a compressibility indication flag attached to the received data indicates "ON." When yes is determined, the operation goes to step S53. When no is determined, the operation goes to step S54.

[Step S53] The compression control unit 110 expands the received data.

[Step S54] The compression control unit 110 passes the received data to application software (the gateway 130, the web server 140, or the mail server 150) which should process the received data. Thereafter, the operation goes to step S34 in FIG. 9.

As described above, it is possible to perform compression processing of only data which can be effectively compressed. Therefore, useless compression processing can be reduced, and the processing efficiency in data compression can be increased. In addition, since the data which can be effectively compressed are compressed before transfer, the volumes of the transferred data and the transfer times are reduced.

The system in the present embodiment is effective, in particular, when content containing a great number of compressed data items is transferred. For example, consider a case in which a webpage containing a great number of images of commodities is produced, transferred to a server, and stored and displayed in the server. Usually, the main body of the webpage is described in HTML, and the data form of the main body is a text form. However, almost all of image data are compressed in advance. Therefore, when the system in the present embodiment is used in the above case, it is possible to perform compression processing with high processing efficiency.

Figure 12:
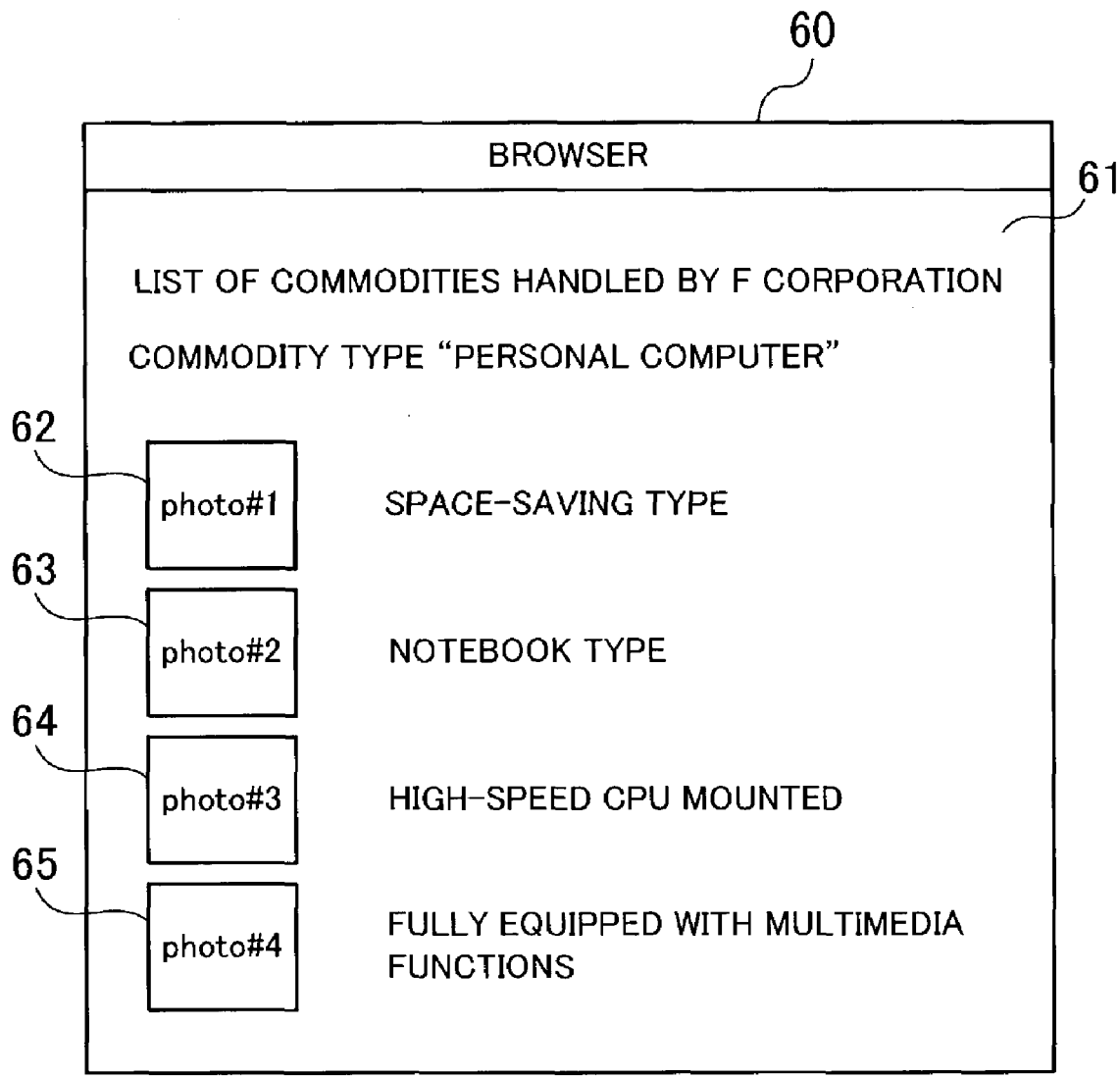
FIG. 12 is a diagram illustrating an example of transferred data.
Figure 13:
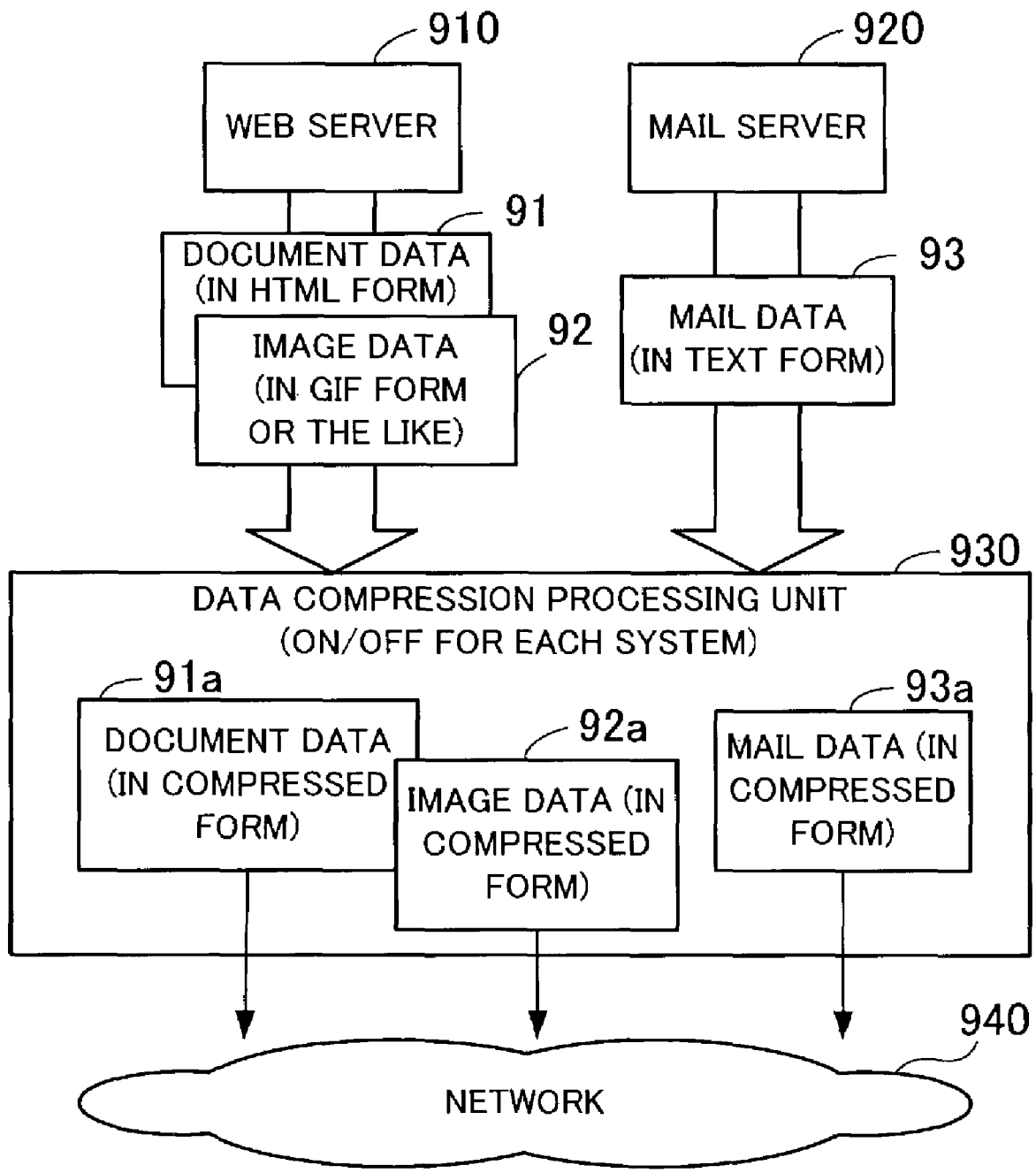
FIG. 13 is a conceptual diagram illustrating the conventional data compression processing.

FIG. 12 is a diagram illustrating an example of transferred data. FIG. 12 illustrates an example of a screen which is displayed by the web browser 230, and includes contents of a received webpage. First, a main body described in HTML is transferred to the screen 60, and subsequently compressed files in GIF or JPEG forms are transferred. In the example of FIG. 12, the HTML main body 61 and images 62 to 65 obtained by expanding the image files are displayed.

When the webpage having the above contents is transmitted in the system in the present embodiment, an HTML header and the HTML main body are compressed before transfer, and compression processing is not performed on the image files before transfer.

Therefore, portions of the webpage which can be effectively compressed are compressed, so that the total data volume can be reduced. In addition, since compression processing is not performed on the image files which cannot be effectively compressed, it is possible to prevent increase in the load imposed on the CPU due to useless compression processing.

Although, in the above embodiment, the present invention is applied to communication through a mobile network, the present invention can also be applied to communications using other networks. For example, a TV receiver system and an audio system can be connected to the Internet through a so-called home network. When the present invention is applied to data communication between the above TV receiver system or audio system and a communication server, data can be efficiently transferred.

In addition, in the above embodiment, it is determined that compression is unnecessary when a predetermined number of successive compression attempts result in inefficient compression. Alternatively, each data item to be compressed can be determined to be unnecessary when a predetermined number of unit data elements constituting the data item are inefficiently compressed (even if the inefficiently compressed unit data elements are not successive unit data elements). The latter case can be realized by removing the operation in step S48 from the sequence of FIG. 10. For example, in some cases, uncompressed control codes are periodically arranged in compressed data, and the number of successive unit data elements which are inefficiently compressed may not reach the predetermined number. In such cases, when the number of inefficiently compressed unit data elements are counted regardless of whether or not the inefficiently compressed unit data elements are successive ones, it is possible to transmit the already compressed data without further compression which is unnecessary.

The data which can be efficiently compressed include: text data (with the extension "txt"); HTML documents (with the extension "html"); uncompressed image files (with the extension "bmp"); execution modules (with the extension "exe"); library modules (with the extension "dll"); word processor document files (with the extension "doc" or "oas"); and the like. On the other hand, the data which cannot be efficiently compressed include: compressed image files (with the extension "gif" or "jpeg"); files in compressed forms (with the extension "zip," "lzh," or "cab"); self-extracting files (with the extension "exe"); and various streaming data of voice and images.

The above processing functions can be realized by computers. In this case, programs which describe details of the functions which the communication server 100 and the terminals 200 to 202 should have are provided. When the above programs are executed by computers, the above processing functions can be realized by the computers.

The programs describing the details of the processing functions can be stored in a recording medium which can be read by computers. The computer-readable recording medium may be a magnetic recording device, an optical disc, an optical magnetic recording medium, a semiconductor memory, or the like. The magnetic recording device may be a hard disk drive (HDD), a flexible disk (FD), a magnetic tape, or the like. The optical disc may be a DVD (Digital Versatile Disc), a DVD-RAM (Random Access Memory), a CD-ROM (Compact Disc Read Only Memory), a CD-R (Recordable)/RW (ReWritable), or the like. The optical magnetic recording medium may be an MO (Magneto-Optical Disc) or the like.

In order to put the programs into the market, for example, it is possible to sell a portable recording medium such as a DVD or a CD-ROM in which the programs are recorded. Alternatively, the programs can be stored in a storage device belonging to a server computer, and transferred to other computers through a network.

A computer which executes a program can store the program in a storage device belonging to the computer, where the program is originally recorded in, for example, a portable recording medium, or is initially transferred from a server computer. Then, the computer can read the program from the storage device, and perform processing in accordance with the program. Alternatively, the computer may directly read the program from the portable recording medium for performing processing in accordance with the program. Further, the computer can sequentially execute processing in accordance with each portion of the program every time the portion of the program is transferred from the server computer.

As explained above, according to the present invention, effectiveness of compression processing is determined based on a result of compression of a portion of data to be compressed, and the remaining portion of the data is compressed only when the portion of data is effectively compressed. Therefore, processing efficiency in data compression is improved.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a data compression program for compressing data, said data compression program makes a computer perform a sequence of processing which comprises:

receiving consecutive data elements;

compressing each of the consecutive data elements individually to obtain compressed data elements while a number of unsatisfactory compression attempts is less than a predetermined number;

comparing a compressed size of each of the compressed data elements with an original size of the consecutive data elements corresponding thereto to determine whether each of the compressed data elements has been compressed effectively;

transmitting the compressed data elements; and when said comparing has determined one of the consecutive data elements has not been compressed effectively, incrementing the number of unsatisfactory compression attempts by one; and when said comparing has determined the one of the plurality of consecutive data elements has been compressed effectively, setting the number of unsatisfactory compression attempts equal to zero.

2. The computer-readable medium according to claim 1, wherein said sequence of processing further comprises determining not to compress the remaining data elements which are to be transmitted subsequent to the compressed data elements through a currently used network connection when it is determined that at least one of the consecutive data elements was not compressed effectively.

3. The computer-readable medium according to claim 1, wherein said determining determines that the consecutive data elements have not been compressed effectively when a predetermined number of the compressed data elements with unsatisfactory compression efficiency are found.

4. The computer-readable medium according to claim 1,
wherein the consecutive data elements are to be transmitted to a device connected to said computer through a network, and
wherein each data element transmitted is given a compressibility indication flag indicating whether the data element is compressed, when the data element is transmitted through the network.

5. The computer-readable medium according to claim 1,
wherein the consecutive data elements are to be transmitted to a receiving device connected to said computer through a network, and
wherein each of the data elements is as large in data size as a reception buffer disposed in the receiving device.

6. A data compression method for compressing data, comprising:
receiving consecutive data elements;
compressing each of the consecutive data elements individually to obtain compressed data elements while a number of unsatisfactory compression attempts is less than a predetermined number;
comparing a compressed size of each of the compressed data elements with an original size of the consecutive data elements corresponding thereto to determine whether each of the compressed data elements has been compressed effectively;
transmitting the compressed data elements; and
when said comparing has determined one of the consecutive data elements has not been compressed effectively, incrementing the number of unsatisfactory compression attempts by one; and
when said comparing has determined the one of the plurality of consecutive data elements has been compressed effectively, setting the number of unsatisfactory compression attempts equal to zero.

7. A data compression device for compressing data, comprising:
means for receiving consecutive data elements;
means for compressing each of the consecutive data elements individually to obtain compressed data elements while a number of unsatisfactory compression attempts is less than a predetermined number;
means for comparing a compressed size of each of the compressed data elements with an original size of the consecutive data elements corresponding thereto, thereby determining whether each of the compressed data elements has been compressed effectively;
transmitting the compressed data elements; and
when said comparing has determined one of the consecutive data elements has not been compressed effectively, incrementing the number of unsatisfactory compression attempts by one; and
when said comparing has determined the one of the plurality of consecutive data elements has been compressed effectively, setting the number of unsatisfactory compression attempts equal to zero.

8. A data compression apparatus, comprising,
a data compression unit compressing a first group of data segments less than a sum total of data to be compressed;
a compression comparison unit comparing the first group of data segments before and after compression; and
a compression determining unit determining whether to compress a second group of data segments when the first group of data segments has been compressed beyond a predetermined threshold.

* * * * *